April 30, 1929.  W. F. OLIVER  1,711,206
PISTON FOR HYDRAULIC BRAKE MECHANISM
Filed March 17, 1927
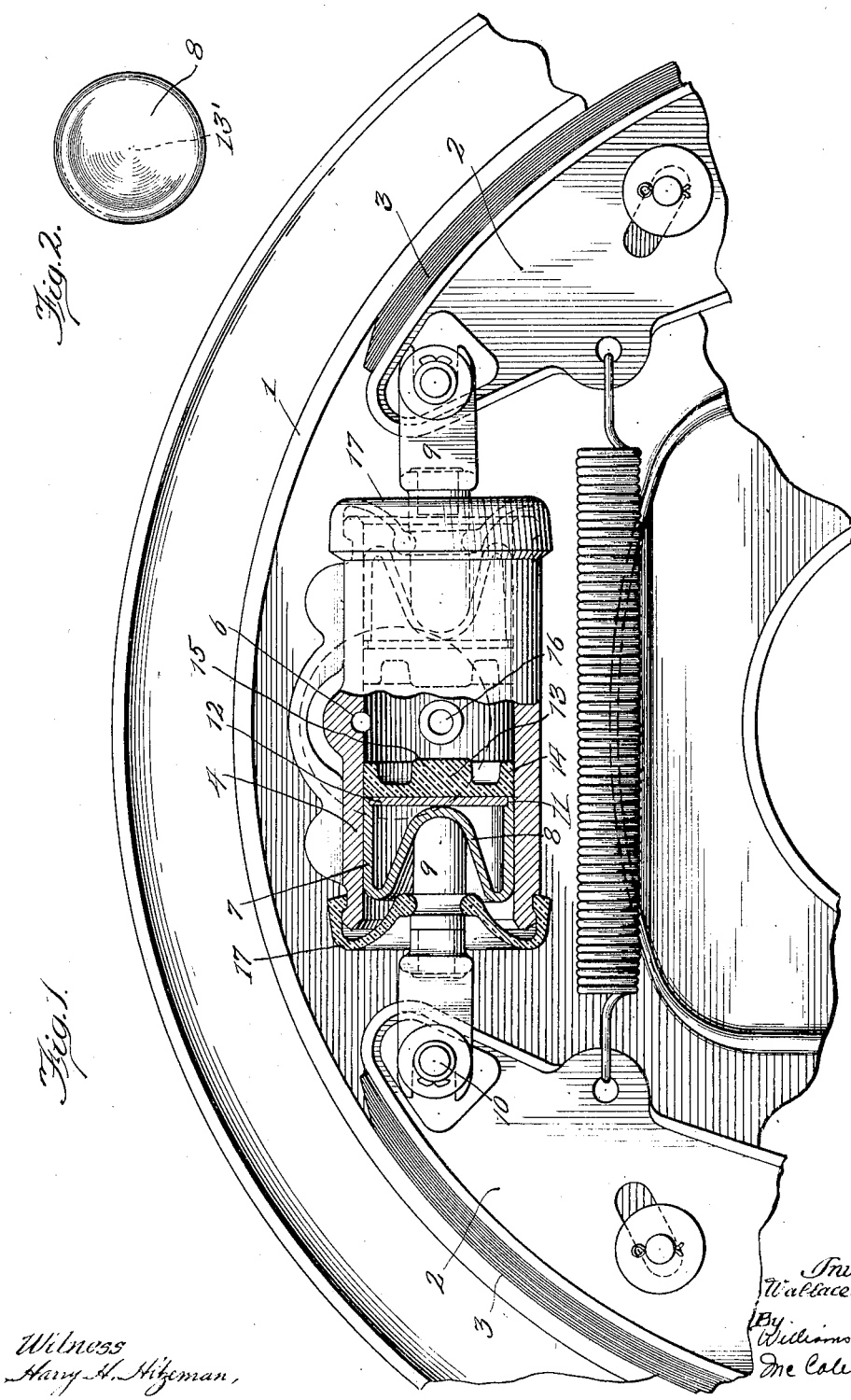

Patented Apr. 30, 1929.

1,711,206

UNITED STATES PATENT OFFICE.

WALLACE F. OLIVER, OF DETROIT, MICHIGAN, ASSIGNOR TO HYDRAULIC BRAKE COMPANY, OF LOS ANGELES, CALIFORNIA, A CORPORATION OF CALIFORNIA.

PISTON FOR HYDRAULIC BRAKE MECHANISM.

Application filed March 17, 1927. Serial No. 175,955.

My invention relates to improvements in pistons for hydraulic brake mechanism and more particularly to such a piston constructed of pressed metal.

An object of the invention is to provide a piston of the character described which may be manufactured at a minimum cost yet which possesses all of the features and advantages obtained by the use of a solid machined piston member.

A further object of the invention is to provide a piston of the character described which is so constructed as to cooperate with the brake shoe operating rod to form a ball joint by engagement therewith, thus permitting operation of the brake shoe through the strain as between the piston and shoe.

A further object of the invention is to provide a piston of the character described in which a novel means is employed for preventing damage to the relatively thin peripheral wall of the piston packing.

Other objects and advantages of my invention are set forth in the following description of a particular and preferred embodiment thereof, as illustrated in the accompanying drawings, wherein:

Fig. 1 is a fragmentary elevation of a hydraulic brake mechanism, a part thereof in section, and Fig. 2 is an outer end view of the improved piston.

I employ my improved piston in connection with a hydraulic brake mechanism similar to the type set forth and described in my United States patent for braking apparatus, No. 1,468,600, issued September 18, 1923.

This brake mechanism consists, with reference to Fig. 1, of a brake drum 1, a pair of brake shoes 2, each of which carry brake lining 3 on the peripheral walls thereof, and a hydraulic brake shoe operating mechanism generally indicated at 4.

This mechanism consists in a double cylinder 5 formed of a single member with the cylinder portions in alignment and communicating with one another. Fluid under pressure is admitted to the cylinders through a common port 6 by any well known means such as the hydraulic pump operated by the brake pedal of the vehicle upon which the braking mechanism is installed.

My present invention relates to pistons for disposition within the cylinder member 5, each of which consists of a cup-shaped member 7 having its external wall slightly less in diameter than the internal diameter of the cylinder member.

The outer or closed end of the member 7 is drawn inwardly as shown at 8 to form a deep ball socket. The contour of the socket at its innermost end is such as to engage with a brake shoe operating rod 9 having a semispherical end portion which uniformly contacts with the adjacent walls of the ball socket portion 8 of the cylinder.

The outer end of the brake shoe operating rod is engaged at 10 with the adjacent end of the brake shoe 2 so that movement of the pistons outwardly or apart from one another will cause the brake shoes to move toward the brake drum 1 and engage the brake linings supported on the shoes therewith.

The inner peripheral edge of the member 7 is rabbeted as shown at 11, forming a shoulder upon which a metal disc 12 is disposed.

The metal disc 12 is spot welded at 13' to the innermost end of the socket portion 8 of the member 7, thus increasing the rigidity of the piston assembly.

The members 7 and 12 are preferably constructed of sheet steel thereby providing maximum strength.

A rubber piston packing member 13 abuts the inner end of the piston as shown in Fig. 1 and serves to establish a fluid-tight seal between the piston and cylinder walls.

This packing member 13 has a relatively thin flexible peripheral wall portion 14 which assists materially in effecting the fluid tight seal.

The packing 13 is further provided with a centrally located boss portion 15 extending outwardly from the rear wheel to a plane beyond the rearward edge of the wall portion 14. This member is intended for engagement with an inward radially extending stop pin 16 at the midpoint of the cylinder member 5 to limit the retraction of the piston within the cylinder.

A flexible dust cap 17 covers the outer ends of the cylinder 5 through which the brake shoe operating rods 9 project.

When in operation my improved piston transmits movement to the brake shoes 2 with a minimum strain upon the piston and brake shoe connections therefor, due to the ball and socket union between the piston and the piston rod 9 as described. Thrust upon the packing member 15 as by the introduction under pressure of fluid through the port 6 is directly transmitted through the plate 12 and contacting socket portion 8 to the brake shoe operating rod 9. There is thus no strain of any sort upon the members or portions of the piston which might eventually cause wear and inefficiency in operation.

What I claim is new and desire to secure by Letters Patent of the United States is:

1. A piston comprising a hollow shell having its side walls fashioned for engagement with a cylinder wall and having its outer end wall depressed to provide a socket for receiving one end of a brake shoe operating rod, and a plate for closing the inner end of the shell, said plate abutting the depressed wall portion.

2. A piston comprising a hollow shell having its side walls fashioned for engagement with a cylinder wall and having its outer end wall depressed to provide a socket for receiving one end of a brake shoe operating rod, a plate for closing the inner end of the shell, said plate being permanently fixed to the inner surface of the depressed socket portion of the shell, and a piston packing member disposed upon the plate.

3. A piston for actuation by fluid pressure comprising a pressed metal cup-shaped member having its side walls fashioned for engagement with a cylinder wall and having its outer end wall depressed to form a socket for receiving one end of a brake shoe operating rod, a plate disposed over the open end of said member and secured thereto and a piston packing member carried by the plate.

4. A piston for actuation by fluid pressure comprising a pressed metal cup-shaped member having its side walls fashioned for engagement with a cylinder wall and having its outer end wall depressed to form a semi-spherical socket for receiving one end of a brake shoe operating rod, a plate disposed over the open end of said member abutting the depressed socket portion of the member and secured thereto and a piston packing member carried by the plate.

5. A piston for actuation by fluid pressure comprising a pressed metal cup-shaped member having its side walls fashioned for engagement with a cylinder wall and having its outer end wall depressed to form a socket for receiving and positioning one end of a brake shoe operating rod, a plate disposed over the open end of said member and secured thereto, said plate contacting the depressed end wall, and a piston packing member carried by the plate, said packing member having piston stop abutment portion co-axially with said depressed end wall portion.

6. A piston construction comprising a stamped sheet metal body member having a generally M-shaped longitudinal cross section with a cylindrical periphery, and a plate disposed across the base of the M forming a face for a piston packing.

7. A piston structure for operation by the thrust of a link member, comprising a body portion pressed from sheet metal into a substantially M-shaped longitudinal cross section, the converging portions of the M forming a rearwardly opening socket for the reception of the end of a thrust link, the peripheral wall being cylindrically conformed, and a disc secured across the forward opening of the body and secured at its center to the apex of the converging portions of the M to form a face for a floating piston packing.

In witness whereof, I hereunto subscribe my name this 12th day of March, 1927.

WALLACE F. OLIVER.